July 2, 1940.  B. F. ROSENBERG  2,206,292
METHOD OF MAKING A DRILL SLEEVE
Filed May 13, 1938
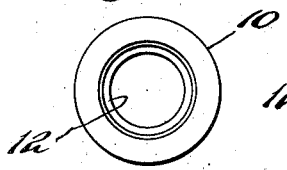
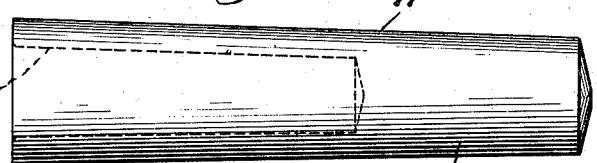
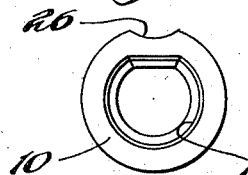
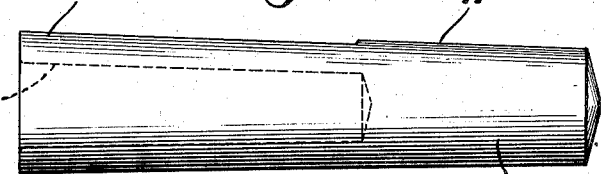
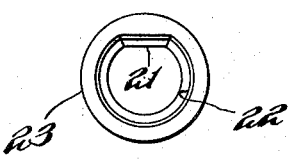
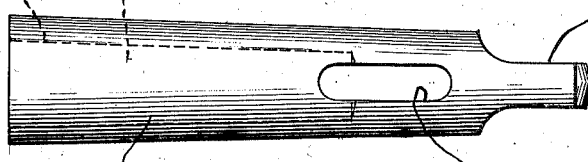
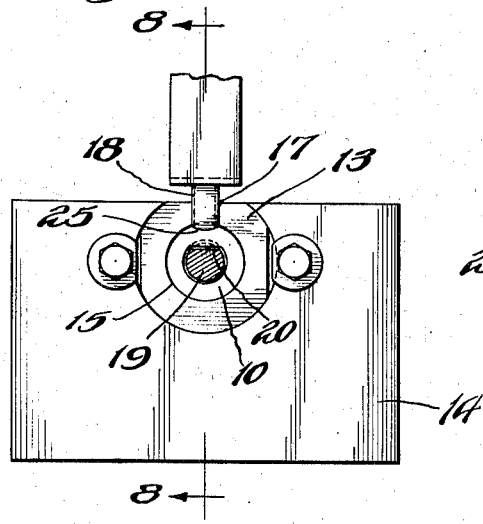
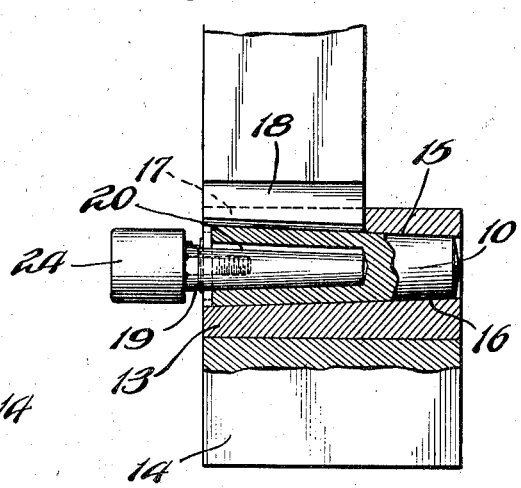
INVENTOR.
Benjamin F. Rosenberg
BY Glenn S. Noble
ATTORNEY.

Patented July 2, 1940

2,206,292

UNITED STATES PATENT OFFICE 2,206,292

METHOD OF MAKING A DRILL SLEEVE

Benjamin F. Rosenberg, Chicago, Ill., assignor to Scully-Jones & Company, Chicago, Ill., a corporation of Illinois Application May 13, 1938, Serial No. 207,697

4 Claims. (Cl. 76—108)

This invention relates to devices for driving tools of various kinds such as drills, reamers, boring bars, arbors, or the like, and are more or less commonly known as drill sleeves. Sleeves or driving devices of this kind have been used very generally for actuating drills having flattened shank portions. In some cases the drills are made in this form but in many instances the tang portions of the drills become broken off and the drill shanks are then flattened so that they may be driven by means of these drill sleeves. Heretofore such drill sleeves which were made by the ordinary methods were not particularly accurate and with increased accuracy required for drilling and other purposes, as for instance in the engine or automobile manufacture, such drill sleeves could not be satisfactorily used.

The present invention relates to an improved method of making such drill sleeves whereby they may be made exceedingly accurate at comparatively low cost and to the product produced by such method. Sleeves made in accordance with the present invention will hold the center of a drill approximately six to eight inches in length within one to two thousandths of an inch, as measured in accordance with the usual practice, which degree of accuracy is satisfactory for most commercial uses.

As above indicated, the objects of the present invention are to provide an improved tool or drill holder and to provide an improved method or process of manufacturing the same whereby the holder will be particularly accurate or with very slight variations in all of its essential dimensions; to provide a method of forming a drill sleeve by operations on the blank while cold, which will avoid scaling or warping; and to provide such other improvements and novel features as will appear more fully from the following description.

In the accompanying drawing illustrating the tool and method of making the same, Figure 1 is a side view of the partly formed blank;

Figure 2 is an end view of the same;

Figure 3 is a side view showing the blank after being subjected to the forming operation;

Figure 4 is an end view of the device as shown in Figure 3;

Figure 5 is a side view of the completed drill sleeve;

Figure 6 is an end view of the same;

Figure 7 is a front view showing the dies and forming operation; and

Figure 8 is a view taken on the line 8—8 of Figure 7.

The blank 10 is made with the desired outside taper 11 such as a Morse taper or the like, and has a hole or socket 12 with tapered walls, which hole terminates at any desired distance from the end as indicated.

It is necessary for the hole or recess 12 to have a flat side for engagement with the flattened side or shank of the drill, and the subsequent operations are directed principally to the forming of this flat side while holding the periphery of the hole within very accurate limits. In order to do this the blank 10 is inserted in a die 13 which is shown as being held in a die block 14 but which die may be of any desired construction. The die has an opening 15 with walls 16 which are tapered to substantially the same taper or conformation as the outside of the blank 10. The die 13 also has a longitudinal lateral slot 17 for receiving a punch 18. While such punch and die are illustrated as substantially the form used it will be understood that any suitable device of this kind may be utilized and the drawing may be considered as being diagrammatic in some respects.

It will also be understood that the die and punch are to be used with any suitable punch press or the like (not shown) adapted for the purposes intended. The punch member 18 of the fixture for pressing down the flat side of the sleeve is preferably substantially the same width at its large end as the width of the flat at the outer end of the sleeve and is tapered longitudinally to conform to the taper of the hole or socket 12.

The blank or work piece 10 is inserted tightly in the hole 16 and a mandrel or inner male die member 19 is inserted in the hole 12 as shown in Figures 7 and 8. This mandrel is tapered to conform to the finished hole in the sleeve and is flattened at one side as shown at 20 to conform to the flat side 21 of the hole 22 in the completed drill sleeve 23 as shown in Figures 5 and 6. The mandrel 19 is accurately finished to give the exact size and conformation of the hole desired in the completed sleeve. It is preferably provided with a head 24 for convenience in removing it from the work piece as the forming operation is completed.

After the blank 10 is inserted in the die and the mandrel inserted in the blank 10 as shown in Figures 7 and 8 the punch 18 is pressed downwardly against the outer wall of the work piece or blank and forces the adjacent portion of the blank inwardly against the flat side of the mandrel so that the inner wall of the blank will be flattened to the desired shape for the completed sleeve. The end of the punch is curved transversely as shown at 25 so that it will properly press the material inwardly and form the flat without shearing the walls of the blank. After the punch has been actuated the blank will have a longitudinal groove 26 on the outer surface as shown in Figures 3 and 4, but the inner hole or socket opening will be of substantially the exact shape desired and as the operation is performed while the metal is cold the surfaces are not injured or scaled as would be occasioned if the operation was done by heat forging or other hot treatment used. The blank or sleeve will also be of the desired shape without being warped as would occur if heat treatment or operations involving heat were used in the manufacture of the sleeve.

After the pressing has been done as shown in Figures 3 and 4 the blank is finally turned and ground or otherwise finished in order to remove the groove 26 and to give the desired outer size as shown in Figures 5 and 6. A tang 27 is also formed on the end of the sleeve and a transverse opening 28 made to complete the sleeve so that it may be utilized in the well known manner.

While I have shown and described a particular form of drill sleeve, it is apparent that other tools or driving members may be made in accordance with this invention and the methods utilized may also be varied within the scope of the invention so that I do not wish to be limited to the form herein described or to the exact process except as specified in the following claims.

I claim:

1. The herein described method of forming a drill sleeve or the like which comprises making a blank having a tapered outer surface and having an annular recess extending inwardly from the large end thereof, the sides of the recess being substantially parallel to the sides of the blank, then placing the blank in a die having a hole of exactly the same conformation as the blank throughout the larger portion thereof and having a slot in one side, then placing a mandrel of exactly the same shape as the recess, except that one side thereof is flattened longitudinally of the mandrel, in the recess, and then projecting a punch through the slot in the die to cause the adjacent portion of the blank to be forced inwardly against the flattened side of the mandrel while all other surfaces of the blank are prevented from deformation or relative movement, substantially as described.

2. The method of making a drill sleeve of accurate dimensions and having a longitudinal drill-receiving hole with a portion of its side wall deformed to engage with a similarly shaped portion of the drill, which consists in providing a blank of larger diameter than the finished sleeve and having a recess of circular cross section therein of substantially the exact diameter desired in the finished sleeve, then placing said blank in a holding die and inserting a mandrel having the exact shape of the desired recess in the finished sleeve, with one side shaped to conform to the desired deformity in the recess of the finished sleeve, in the recess in the blank, then punching in the portion of the blank adjacent to the recess in the mandrel by means of a suitable punch, said holding die and mandrel serving to prevent any deformation in the outer or inner surfaces of the sleeve except in the area acted upon by the punch, and finally withdrawing the blank from the die and removing the mandrel and then finishing the outer surface of the blank to the desired circular tapered form.

3. The method of making a drill sleeve which consists in making a tapered blank of larger diameter than the finished sleeve with a tapered recess therein which is accurately centered on the axis of the sleeve, and of substantially the desired form and dimension required in the finished sleeve, then placing the blank in a holding die having a socket in which the blank closely fits, and having a slot through the side wall of substantially the same length as the recess, then inserting a mandrel having a flat side and conforming to the shape of the hole desired in the finished sleeve, in said recess, then pressing the side of the blank inwardly against the flat side of the mandrel while cold, by means of a punch operating through said slot, and finally finishing the outer portion of the blank to eliminate the groove formed by the punch, and to reduce the same to the desired size and also forming a tang at one end of the sleeve for the purposes described.

4. The process of manufacturing a tool driving member of the character set forth, which consists in providing a tapered steel blank of circular cross section and of larger diameter than the finished driving member, and also having a coaxially tapered hole at one end of exactly the shape desired for receiving the tool, with the exception of a flat side for engagement with the tool, then placing said blank in a die having a socket conforming to the outer surface of the blank and having a longitudinal slot of substantially the same length as the hole in the blank, then placing a tapered inner male die member having one side flattened, in the hole, then pressing the side of the blank inwardly while cold against the flattened portion of the mandrel by means of a punch working through said slot while the outer periphery of the blank and the walls of the tapered hole are held by the outer die and the inner male die member against any deformation or relative movement except in the area acted upon by the punch, and finally removing the blank from the dies and finishing the same to the desired outer size and shape, all of said operations being performed cold and preventing scaling or warping of the blank.

BENJAMIN F. ROSENBERG.